G. A. SOKOLOVE.
SAFETY LOCK FOR MOTOR VEHICLES.
APPLICATION FILED MAR. 11, 1920.
1,424,599.
Patented Aug. 1, 1922.
3 SHEETS—SHEET 1.
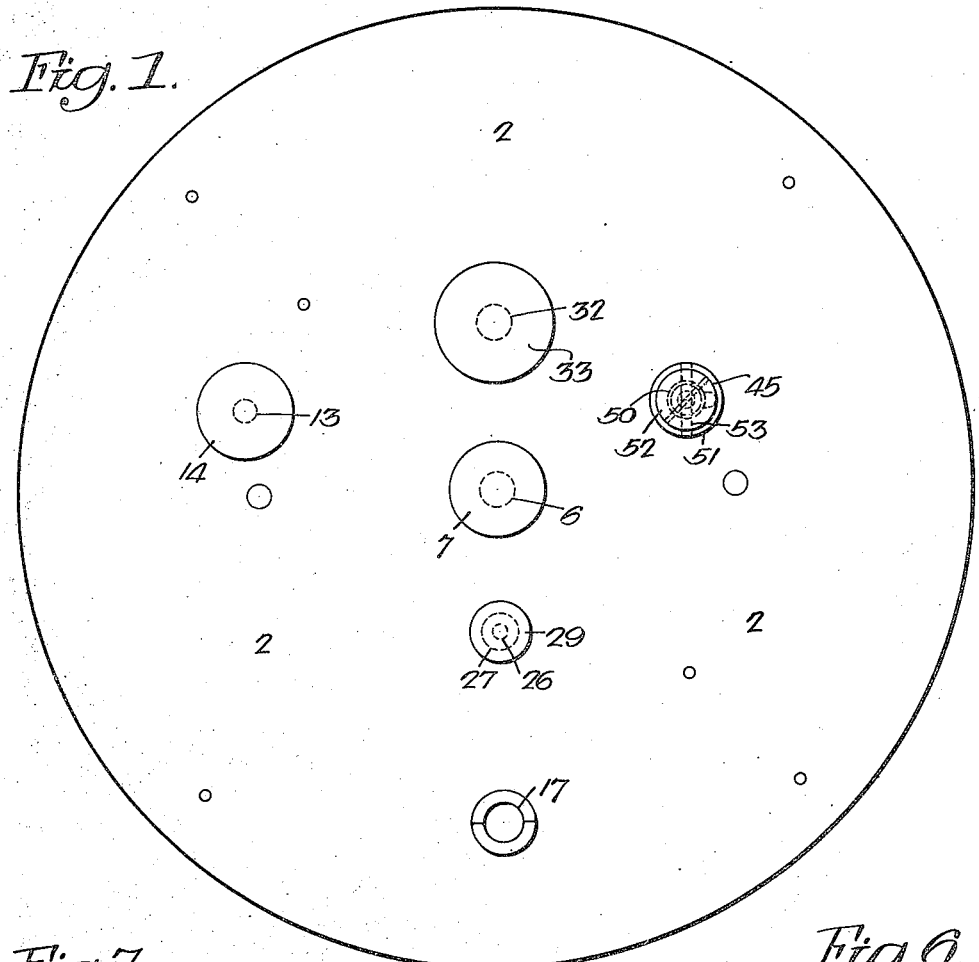
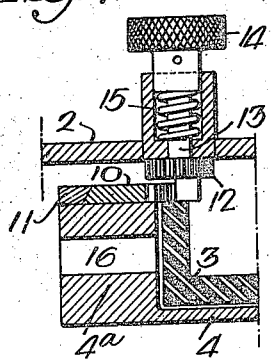
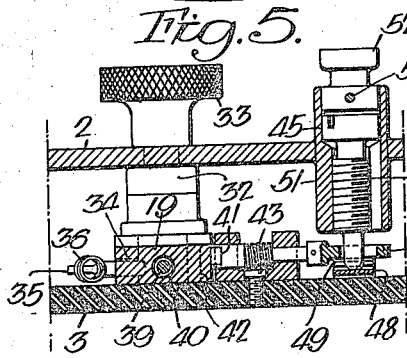
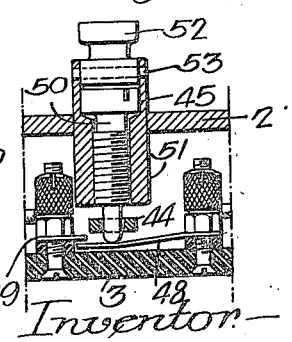
Inventor—
George A. Sokolove
by his Attorneys,
Howson & Howson.

G. A. SOKOLOVE.
SAFETY LOCK FOR MOTOR VEHICLES.
APPLICATION FILED MAR. 11, 1920.
1,424,599.
Patented Aug. 1, 1922.
3 SHEETS—SHEET 2.
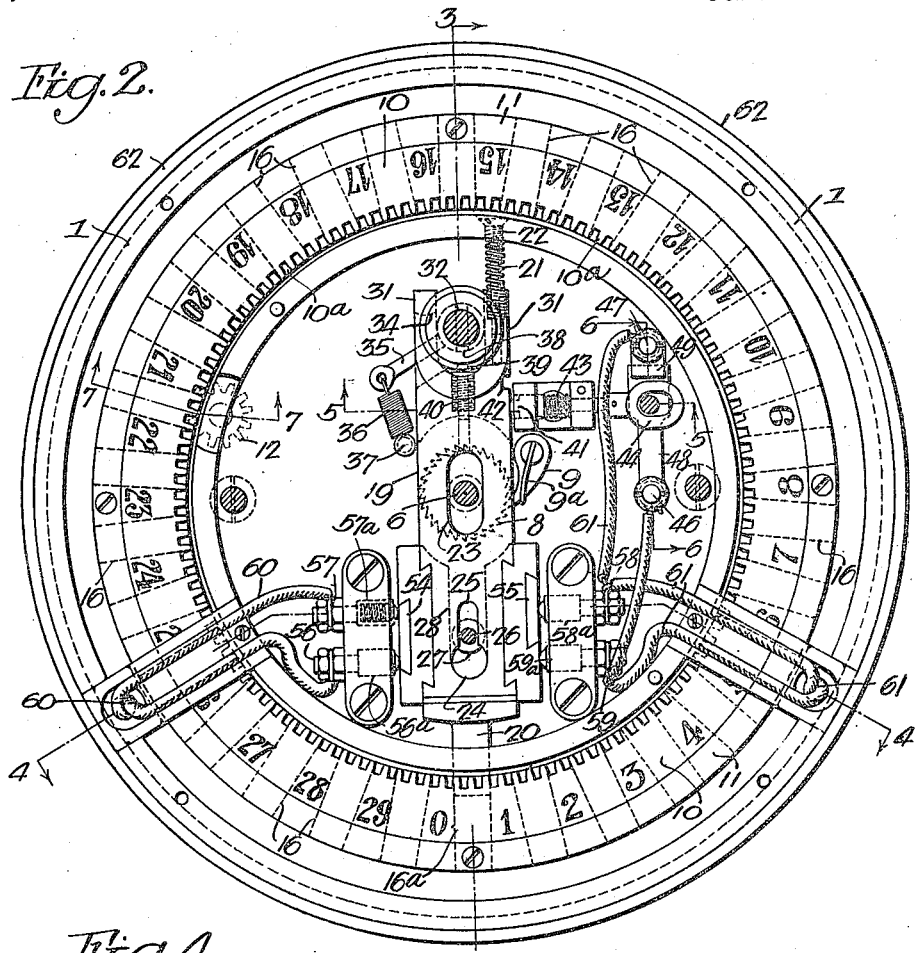
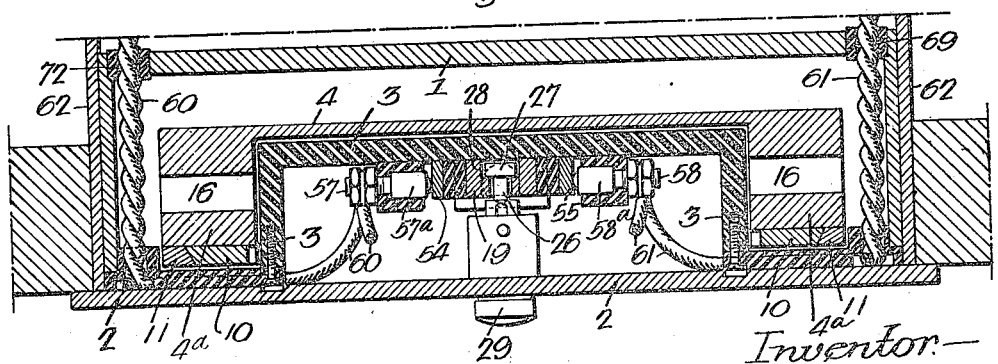
Inventor.—
George A. Sokolove.
by his Attorneys.
Howson & Howson

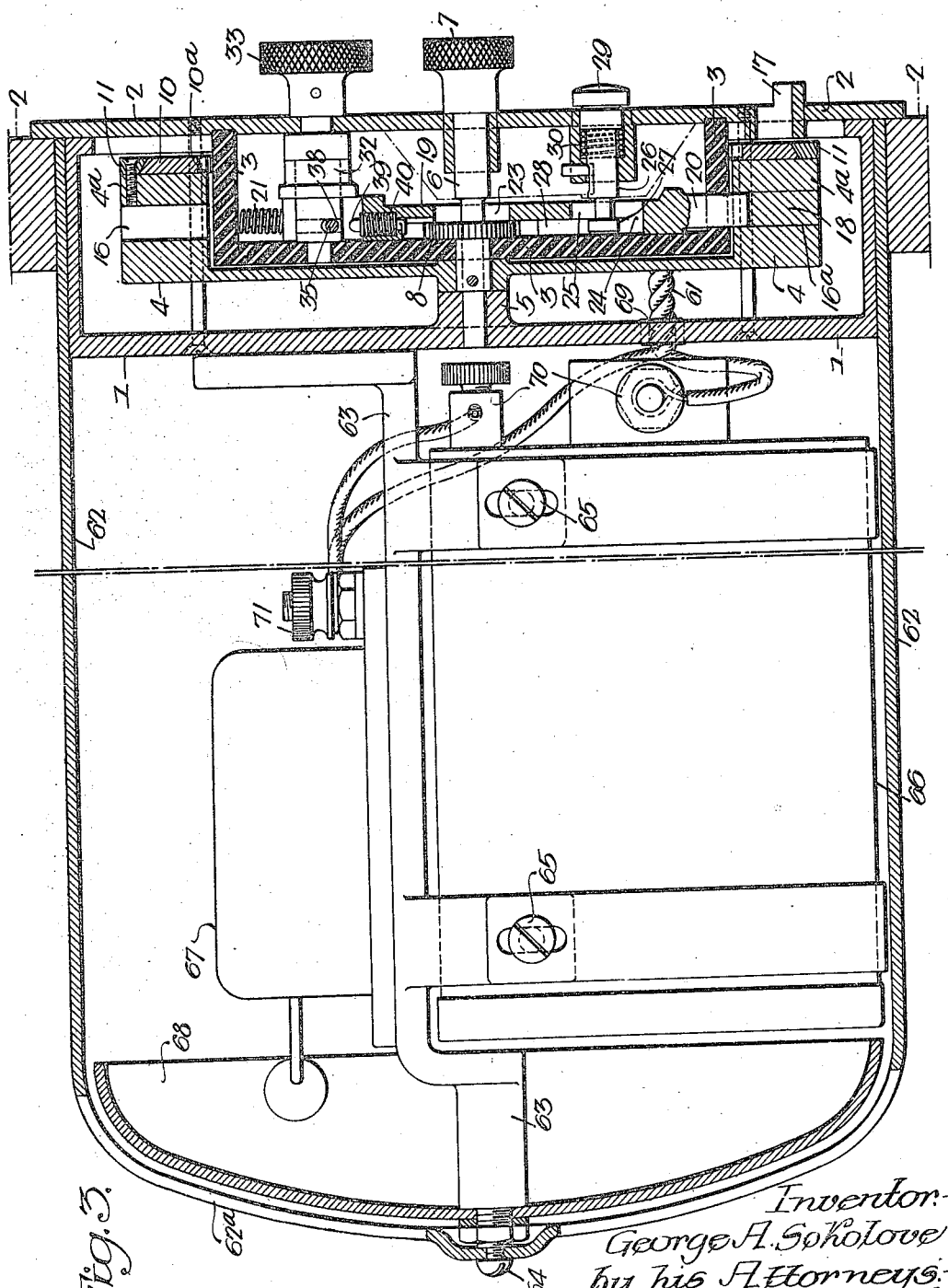

UNITED STATES PATENT OFFICE.

GEORGE A. SOKOLOVE, OF PHILADELPHIA, PENNSYLVANIA.

SAFETY LOCK FOR MOTOR VEHICLES.

1,424,599.         Specification of Letters Patent.         Patented Aug. 1, 1922.

Application filed March 11, 1920. Serial No. 364,979.

*To all whom it may concern:*

Be it known that I, GEORGE A. SOKOLOVE, a citizen of the United States, residing in Philadelphia, Pennsylvania, have invented certain Improvements in Safety Locks for Motor Vehicles, of which the following is a specification.

My invention relates to safety lock devices for automobiles, and the object of my invention is to provide a device comparatively simple in construction and easily attachable to the dash-board or other suitable part of an automobile, which comprises a means for breaking the ignition circuit of the motor, and for preventing any but the rightful owner from closing the said ignition circuit after it is once broken.

A still further object is to provide an alarm and mechanism whereby any one tampering with the lock device other than the rightful owner will sound said alarm.

A still further object of the invention is to provide mechanism whereby after the alarm is once sounded, one is unable without considerable delay to shut the alarm off or to reset the mechanism controlling the ignition circuit so as to permit the ignition circuit being closed.

In the attached drawings:

Figure 1, is a plan view of my device with the cover plate in place;

Fig. 2, is a horizontal section of the device taken on the line 2—2, Fig. 3;

Fig. 3, is a vertical section of my device taken on the line 3—3, Fig. 2;

Fig. 4, is a vertical section of the upper portion of my device taken on the line 4—4, Fig. 2, and Figs. 5, 6 and 7, are vertical sections of portions of my device taken on the lines 5—5, 6—6 and 7—7, respectively, of Fig. 2.

With reference to the drawings, 1 indicates a shallow bowl-shaped casing, and 2 a cover plate adapted to be secured thereto. Suitably mounted within the casing 1 and immovable with respect thereto is a second bowl-shaped casing 3 made, preferably, of fiber or other insulating material. In the present instance the casing 3 is shown disposed within a member 4, which is rotatably mounted upon a stud 5 in the bottom of the casing 1, said member having comparatively thick side walls 4ª. The member 4 is fixed to a pin 6, the lower end of which extends through the stud 5 and the bottom of the casing 1, said shaft also extending upwardly through an aperture in the casing 3, and also through the cover plate 2, and having a milled head 7 secured to the upper end thereof above the cover plate. By turning the head 7, it is apparent that the member 4 may be rotated upon the stud 5. A ratchet wheel 8 secured to the pin 6 is engaged by a pawl 9 mounted in the base of the casing 3, a spring 9ª tending to hold the pawl against the ratchet wheel to prevent the said shaft 6 and consequently the member 4 from rotating in other than the desired direction.

Mounted upon the upper face of the sides 4ª of the member 4 is a ring-shaped disk 10, said disk being held in position upon the upper face of the member 4 by means of a retaining ring 11 secured to the upper face of the sides 4ª outside of the said ring 10, the outer edge of the ring 10 being beveled to underlie the correspondingly beveled edge of the retaining ring 11. The inner edge 10ª of the ring 10 is toothed, as most clearly shown in Fig. 2, and a pinion 12 carried by a pin 13, mounted in the cover plate 2, is adapted to engage the teeth upon the ring 10, so that the latter may be turned independently of the member 4 upon which it is mounted. The pin 13 extends through the cover plate and has a milled head 14 upon the outer end whereby the same may be turned in order to rotate the pinion 12, and a spring 15 normally retains the pin 13 in elevated position so that the pinion 12 lies out of contact with the teeth upon the ring 10, as shown in Fig. 7.

Extending through the sides of the member 4 is a series of radial apertures 16, and the ring 10 is graduated and carries numbers corresponding with the said apertures 16 in the said member.

A peep hole 17 is provided in the cover plate 2 above the ring 10 so that the numbers marked thereon may be seen from the outside of the casing. In the present instance, I have shown the number of apertures 16 in the member 4 to be thirty, and the scale 10 is graduated accordingly. All of the apertures 16 but one extend completely through the sides of the member 4, but this one aperture 16ª is stopped, as most clearly shown in Fig. 3, by means of a plug 18 in the outer end thereof.

Slidably mounted in the base of the casing 3 is a bolt member 19, said bolt member having an extension 20 passing through an aperture in the casing 3. The extension 20 is, in the present instance, cylindrical in form, and is adapted to enter the apertures 16 and 16$^a$ in the member 4. In the position shown in Figs. 2 and 3, the extension 20 lies within the aperture 16$^a$ containing the plug 18, and it is clear that the said plug prohibits the said extension 20 from entering into the aperture to the extent of which it is capable, and to the same extent it would enter any of the other apertures 16.

As already stated, the member 19 is adapted to slide back and forth in the casing 3, and a spring 21 interposed between the end of the said member and the inside of the casing 3 exerts a pressure which tends to force the member forward so that the extension 20, if possible, will enter one of the apertures 16 or 16$^a$ in the member 4. A screw 22, extends through the casing 3 and the spring 21, and into an aperture in the end of the member 19, and by this means, although the bolt member is permitted to slide back and forth, the spring is held in place between the end of the said member and the casing 3.

A longitudinal slot 23 is provided in the member 19 to permit passage of the pin 6 through the same and to allow at the same time free sliding motion of the latch. Near the front of the member 19 is an aperture 24, having a slot 25 extending therefrom towards the center of the said latch, and a detent 26 mounted in the top plate 2 extends downwardly into the aperture 24, as most clearly shown in Fig. 3. The detent 26 has a head 27 upon the lower end thereof, said head being of such size as to fit neatly the aperture 24, and a portion of the member 19 is cut away at 28 beneath the slot 25 for the passage of the said head 27 when the bolt is moved forward. The detent 26 mounted in the cover plate 2 extends through the top of the said cover plate and has a knob 29 upon the upper end, and a spring 30 is adapted to hold the detent 26 in a normal elevated position in which the head 27 lies within the upper portion of the aperture 24 of the bolt member at a point above the cutaway portion 28 so that when the detent is in the normal position the member 29 is held against movement. When, however, the detent is forced downwardly by pressure upon the knob 29, the head 27 is made to register with the cutaway portion 28, and the latch member 19 is then free to move forward under the pressure of the spring 21.

The rear end of the latch member 19 is forked, and between the two prongs 31, 31 of this forked portion is established a pin 32, said pin being mounted in the casing 3 and extending through the cover plate 2, and a milled head 33 is secured to the top thereof above the cover plate whereby the said pin may be revolved. Suitably attached to the pin 32 and extending laterally through an aperture 34 in one of the prongs 31, is an arm 35, said arm having secured to the outer end thereof a spring 36, the other end of the spring being attached to a fixed pin 37 in the frame 3. This spring 36 tends to hold the arm in the normal forward position shown in Fig. 2. When, however, the pin 32 is turned in a clockwise direction by manipulation of the head 33, the arm 35 bears against the side of the aperture 34, and the bolt member 19 is thus forced backwardly against the pressure of the spring 21 and the projection 20 is withdrawn from the aperture 16 which it may occupy.

In withdrawing the bolt member, the head 33 is turned until the detent 26 snaps up into the elevated position in which the head 27 lies within the upper portion of the aperture 24, thereby retaining the member in the withdrawn position. The head 33 then being released, the pin 32 will be rotated in an anti-clockwise direction and the arm 35 drawn back to the normal forward position by the tension of the spring 36. In this position of the pin 32, a recess or aperture 38 therein will come into registration with a small spring-pressed detent 39 mounted in the member 19, said detent having a spring 40 which exerts a pressure forcing the said detent forward so that it will enter the said recess 38, and in this manner the pin 32 is held against further rotation until the bolt member is again released and has moved forward.

Mounted in suitable bearings within the casing 3 at one side of the bolt member is a detent 41 which is adapted to enter a recess 42 in the side of said latch member when the latter is in the extreme forward position so as to prevent the further movement and withdrawal of the bolt. The detent 41 has a spring 43 connected therewith which exerts a pressure tending to force the detent forward so that it will enter the recess 42 in the bolt member when the said recess is brought forward into registration with the point of the detent. The detent 41 has attached to the rear thereof a substantially oval collar member 44, as most clearly shown in Figs. 5 and 6.

Mounted in the casing 3, in the present instance one at each side of the collar member 44, are binding posts 46 and 47, the binding post 46 having connected therewith a spring contact member 48 which underlies the said collar portion 44, said spring contact member 48 also underlying a fixed contact member 49 secured to the binding post 47. A screw 50 is mounted in a threaded sleeve 51 in the cover plate 2, the lower end of said screw extending through the collar 44 and normally bearing down upon the spring contact 48 and retaining the latter in a depressed position out of contact with the contact member 49, as most clearly shown in Fig. 6. The screw 50, extending through the collar 44, does not interfere with the free movement of the detent 41. Secured in the upper portion of the sleeve 51 is a stop or plug 52, said plug being secured in the said sleeve in the present instance by means of a pin 53.

Suitably attached to the opposite sides respectively of the bolt member 19 are metal contact members 54 and 55. Mounted in the casing 3 at one side of the latch member 19 adjacent the contact member 54 are two binding posts 56 and 57, said binding posts having connected thereto two spring-pressed contact points 56$^a$ and 57$^a$, respectively, which bear against the sides of the latch member 19 and against the contact member 54 when the latch member is in such position as to bring the said contact member into registration therewith.

Fig. 2 shows the latch member 19 in position in which said contact member 54 lies across the said contact points 56$^a$ and 57$^a$, this position of the member 19 being that assumed when the projection 20 occupies the aperture 16$^a$ which contains the plug 18, as already described. In any other of the positions of the member 19, the member 54 will lie in contact with only one of the points 56$^a$ and 57$^a$.

At the side of the member 19 opposite the contact member 54 is the contact member 55, and this contact member is adapted to register with contact points 58$^a$ and 59$^a$ secured to binding posts 58 and 59, respectively, mounted in the frame 3, the contact member 55 being adapted to lie across the contact points 58$^a$ and 59$^a$ when the bolt member assumes the extreme forward position, which latter position the bolt member assumes whenever the projection 20 enters any one of the apertures 16 in the member 4, instead of the aperture 16$^a$ which contains the plug 18.

The binding posts 56 and 57 are connected by means of wires 60 with the ignition system of the motor vehicle to which this appliance may be attached, while the binding posts 58 and 59, and also the binding posts 46 and 47, are connected by means of wires 61, 61, with a suitable electrically-operated alarm, which will hereinafter be described.

Extending over the casing 1 and having its upper edges abutting the cover plate 2 is an outer casing 62, said outer casing enclosing a supporting frame or bracket 63, which is suitably secured to the under or outer side of the casing 1, the casing 62 being attached to the outer end of the bracket 63 by means of a screw 64 whereby the said casing 62 is held in place. Secured to the bracket support 63 by means of screws 65, 65, is preferably an electric dry cell 66, and also secured in a suitable manner to the bracket support 63 is the bell apparatus 67, the bell 68 of which is mounted in the extreme lower portion of the casing 62, as clearly shown in Fig. 3. Suitable openings 62$^a$ are formed in the casing 62 to insure a clear sounding of the gong 68.

The wires 61 pass from the binding posts 46, 47, 58 and 59, over the top of the casing 3 and the member 4, and downwardly through a properly insulated aperture 69 in the base of the casing 1 and are suitably attached to the binding posts 70, 70, of the dry cell 66 and the binding post 71 of the bell apparatus 67 in such manner as to complete the alarm circuit. The wires 60 extend from the binding posts 56 and 57 over the top of the casing 3 and the member 4, and downwardly through a suitable insulated aperture 72 in the base of the casing 1, from there passing through the casing 62 and connecting with the ignition system of the motor vehicle to which this device is attached.

The operation of the device is as follows:

As previously stated, the circuit of the ignition system is closed and the motor operable only when the bolt member 19 is in the position shown in Fig. 2, this position being that assumed when the projection 20 has entered and occupies the plugged aperture 16$^a$. The operator, then, on leaving his motor manipulates the knurled head 33 upon the pin 32 so as to withdraw the projection 20 of the member 19 from the said plugged aperture 16$^a$, said bolt member being retained in the withdrawn position by means of the detent 26, in the manner previously described. As the member 19 is thus withdrawn, the ignition circuit is broken since the contact member 54 passes out of contact with the contact point 56$^a$. After withdrawing the member 19, the operator then manipulates the milled head 7, thereby turning the apertured member 4 to a position in which the aperture 16$^a$ containing the plug 18 lies out of registration with the projection 20 upon the bolt member. In turning the member 4, the scale 10 upon the upper face thereof is turned likewise, and since the operator of the motor alone knows the number as shown under the aperture 17 which indicates the proper operative position of the one plugged hole 16$^a$, he alone can bring the said member back into the original position in which the said hole and the extension 20 are again brought into registration.

In setting this device, therefore, the operator first notes the number on the scale which lies beneath the aperture 17 in the cover plate, this being the number which he must bring back to position underneath the said aperture 17 in order to bring the plugged aperture 16$^a$ back into the position in which the extension 20 may enter. He then operates the milled head 7 so as to bring some other number under the aperture 17, and if he is unable to see the numbers upon the scale through the said aperture, he may judge the extent of the movement of the member 4 by means of the ratchet and pawl 8 and 9, since these operate to stop the member 4 in positions in which some one of the apertures or the spaces therebetween lies accurately in front of the extension 20.

Any one now attempting to start the motor will have, first, to close the ignition circuit before he can operate the car, and it is apparent that not being in possession of the key number, the chances are slight that he will be able to bring the member 4 back to the proper position, and the extension 20, when the member 19 is released, will in all probability enter one or the other of the holes 16. In this event, the member 19 is permitted to advance to its extreme forward position, and the ignition system still remains broken since the contact member 54 advances to a point where it is in contact with the contact point 56ª alone. On the other hand, the contact member 55 is brought into position closing the alarm circuit, and the alarm signal is therefore sounded. Also when this occurs, the detent 41 enters the recess 42, and locks the bolt member in the advanced position. The bolt member can now be brought back only by removing the plug 52 and the screw 50 from the sleeve 51, and by inserting a wire or similar small object through the aperture so as to exert a pressure upon the collar 44 to withdraw the detent. This, however, will consume considerable time, particularly when the screw 50 is formed with a large number of threads to the inch, and in the meantime the owner or watchman will be warned that some one is tampering with the machine.

It will be noticed that immediately upon the withdrawal of the screw 50, the spring contact member 48 is permitted to rise and comes into contact with the contact member 49, and in this manner the alarm circuit is again closed, so that even after the detent 41 has been withdrawn and the bolt member 19 brought back to the starting position, the alarm will continue to sound until the screw 50 is again inserted in the sleeve 51.

In order to insure the bolt 19 springing as far forward when released as is permitted by the apertures 16 and 16ª, the detent 39 is provided, the operation of which has already been described, and by this means the withdrawing pin 32 cannot be used to allow the latch member to go forward slowly a little at a time, in which case it might be possible for one to advance the latch member to the position in which the ignition circuit is closed and to retain it there by hand while another operates the machine, or by successive attempts to locate the proper aperture.

Provision is made by the pinion 12 and the toothed inner edge of the ring 10 for permitting the operator to shift the ring so as to change the key number at will.

The advantages of this device are among others compactness, ease with which it may be installed, and the comparatively sure protection which it affords. The device is adapted to be placed on the dash-board of a machine, and may take its place with the other instruments thereon without detracting from the appearance of the machine, but rather adding to it. It is also clear that the chances for obtaining the right combination decrease with the increase of the number of apertures in the member 4, and it may be possible to make the action of the device even more complex than in the particular embodiment shown, by making it necessary to bring the bolt member into registration with two or three of the apertures consecutively before it will be possible for the extension to enter the one aperture giving the proper connection.

In the present embodiment, I have shown the scale 10 in such position relative to the apertures 16 that the numbers upon the scale agree with the partitions between the apertures instead of with the apertures themselves. The peep hole 17 is also so arranged that when the plugged hole 16ª is in registration with the projection 20 of the latch member, the blank space upon the scale which follows the key number lies underneath the said peep hole so that in resetting the device, to bring the plugged hole back into proper starting position, the member 4 is turned until the proper reference number comes underneath the peep hole, and then is further turned until the blank space following the said reference number lies beneath the peep hole, in which position of the member 4 the projection 20 may enter the plugged hole. This is merely an additional safeguard, and need not be employed unless desired, and it is apparent that the invention is subject to many changes and modifications without departure from the essential features.

I claim:

1. In a safety lock device, a plurality of pairs of spaced contacts, a member adapted in different positions to connect the contacts of each of said pairs alternately, means for moving the said member from the contact-connecting positions, and means automatically operable for locking said member against movement by said moving means when said member has assumed a position connecting one of said pairs of contacts.

2. In a safety lock device, a plurality of pairs of spaced contacts, a member automatically movable to connect the contacts of each of said pairs alternately, manually operable means for withdrawing the said member from the contact-connecting positions, manually releasable means for retaining the member in the said withdrawn position, manually adjustable selective means for controlling the movement of said member to the respective contact-connecting positions, and means automatically operable for locking said member against withdrawal by said withdrawing means when said member has assumed position connecting one of said pairs of contacts.

3. In a safety lock device, a plurality of pairs of spaced contacts, a member automatically movable to connect the contacts of each of said pairs alternately, manually operable means for withdrawing the said member from the contact-connecting position, manually releasable means for retaining the member in the said withdrawn position, and means for rendering said withdrawing means inoperable after each withdrawing operation until said member has again advanced to contact-connecting position.

4. In a safety lock device, the combination of a plurality of pairs of spaced contacts, a member automatically movable to connect the contacts of each of said pairs alternately, a casing enclosing said contacts and member, means manually operable from the exterior of said casing for withdrawing said member from the contact-connecting position, means manually releasable from the exterior of said casing for retaining the member in the said withdrawn position, means enclosed by said casing and automatically operable for locking said member against withdrawal by said withdrawing means when it has assumed position connecting one of said pairs of contacts, and manually operable means in the interior of said casing for releasing said locking means.

5. In a safety lock device, the combination of a plurality of pairs of spaced contacts, a switch member electrically connected in parallel with one of said pairs of contacts, a member automatically movable to connect the contacts of each of said pairs alternately, a casing enclosing said contacts, switch and member, means manually operable from the exterior of said casing for withdrawing the said member from the contact-connecting position, means manually releasable from the exterior of said casing for retaining the member in said withdrawn position, means permitting release of said locking means from the exterior of said casing, and means whereby such release of said locking means entails the closing of the said switch.

6. In a safety lock device, the combination of two pairs of spaced contacts, a member automatically movable to connect the contacts of each of said pairs alternately, manually operable means for withdrawing the said member from the contact-connecting position, manually releasable means for retaining the member in the said withdrawn position, manually adjustable selective means controlling the movement of said member to the respective contact-connecting positions, means for indicating the positions of the selector permitting movement of said member to the respective contact-connecting positions, and means automatically operable for locking said member against movement by said withdrawing means when it has assumed a position connecting one of said pairs of contacts.

7. In a safety lock device, the combination of a plurality of pairs of spaced contacts, of a movable member adapted in different positions to connect the respective contacts of each of said pairs, an element having a plurality of apertures adapted to be entered by said movable member, said apertures being of differing depths whereby the said member is retained in the respective contact-connecting positions, and means for adjusting said apertured element to bring the desired aperture in position to be entered by said member.

8. In a safety lock device, the combination with a plurality of pairs of spaced contacts, of a movable member adapted in consecutive positions to connect the respective contacts of each pair, an element for regulating the position of said member so that the latter is retained in the respective contact-connecting positions, and means for locking said member against movement when it has assumed a position connecting the contacts of one of said pairs.

9. In a safety lock device, the combination with a plurality of pairs of spaced contacts, of a movable member adapted in consecutive positions to connect the contacts of each of said pairs, means for regulating the position of said member whereby the member is held in the respective contact-connecting positions, means normally operable for withdrawing said member from contact-connecting position, and means operable when the member is in position connecting one of said pairs of contacts for preventing operation of said withdrawing means.

10. In a safety lock device, the combination with a plurality of pairs of spaced contacts, a member movable to positions connecting consecutively the contacts of each of said pairs, a casing enclosing said contacts and member, means operable from the exterior of said casing for withdrawing the said member from contact-connecting position, and means in the interior of said casing for preventing the operation of said withdrawing means when the said member is in a position connecting one of said pairs of contacts.

11. In a safety lock device, the combination with a plurality of pairs of spaced contacts, of a member movable to positions consecutively connecting the respective contacts of each of said pairs, a switch member electrically connected in parallel with one of said pairs of contacts, a casing enclosing said contacts, switch element and member, means operable from the exterior of said casing for withdrawing said member from contact-connecting position, means in the interior of said casing for preventing withdrawal of said member when the latter is in position connecting one of said pairs of contacts, and means entailing the closing of said switch element whereby said preventing means may be manipulated from the exterior of said casing to permit withdrawal of said member.

12. In a safety lock device, the combination with a plurality of pairs of spaced contacts, of a member movable to positions consecutively connecting the respective contacts of each of said pairs, a switch element electrically connected in parallel with one of said pairs of contacts, a casing enclosing said contacts, member and switch element, means operable from the exterior of said casing for withdrawing said member from contact-connecting position, an element in the interior of said casing for preventing withdrawal of said member from position connecting one of said pairs of contacts, an aperture in said casing providing an opening for the manipulation of said element to permit withdrawal of said member, and a plug in said aperture adapted when in position to retain the said switch element in open position, said switch element closing when the plug is withdrawn.

13. In a safety lock device, the combination with a plurality of pairs of spaced contacts, of a member automatically movable to positions consecutively connecting the contacts of each of said pairs, a member having a plurality of apertures adapted to be entered by said member, said apertures being of differing depths whereby the movement of said member to the respective contact-connecting positions is controlled, means for moving said apertured member to bring any desired aperture into position to be entered by said element, an element having characters thereon to indicate the respective apertures, and means for shifting said element with respect to the apertured member to change the relation between said characters and apertures.

14. In a safety lock device, the combination with an automatically movable circuit-closing member, of means for withdrawing the member from circuit-closing position, releasable means for retaining the member in withdrawn position, and means for rendering said withdrawing means inoperable while the member is held by said retaining means.

15. In a safety lock device, the combination with an automatically movable circuit-closing member, of a rotatable shaft, elements interconnecting said shaft and member whereby rotation of the shaft effects withdrawal of the member from circuit-closing position, releasable means for retaining the member in withdrawn position, and means for preventing rotation of said shaft when the member is in said withdrawn position.

16. In a safety lock device, the combination with an automatically movable member, of releasable means for retaining the member in a retracted position, selective means for determining the position to which the member advances when released from the retaining means, means for returning the member to the retracted from the advanced positions, and means operable in one of the advanced positions for preventing return of the member to retracted position.

17. In a safety lock device, the combination with an automatically movable member, of releasable means for retaining the member in a retracted position, selective means for determining the position to which the member advances when released from the retaining means, means for returning the member to the retracted from the advanced positions, a pair of spaced contacts adapted to be connected by the member when the latter is in one of the advanced positions, and means operable in one of the advanced positions for preventing return of the member to retracted position.

18. In a safety lock device, the combination with an automatically movable member, of releasable means for retaining the member in a retracted position, selective means for determining the position to which the member advances when released from the retaining means, means for returning the member to the retracted from the advanced positions, means operable in one of the advanced positions for preventing return of the member to retracted position, means for releasing said return preventing means, a pair of electrical contacts, and means operatively associated with said releasing means for connecting the contacts whereby release of the return preventing means entails the connecting of the contacts.

19. In a safety lock device, the combination with a member automatically movable into a plurality of advanced positions, of means operable in one of the advanced positions for preventing withdrawal of the member, means for releasing the member from the withdrawal preventing means, a pair of electrical contacts, and means operatively associated with said releasing means for connecting the contacts whereby release of the withdrawal preventing means entails the connecting of the contacts.

20. In a safety lock device, the combination with a member automatically movable into a plurality of advanced positions, of a latch automatically movable in one of the advanced positions of the member to retain the member in the advanced position, means for releasing the latch to permit withdrawal of the member including an element normally preventing access to said latch, a pair of electrical contacts normally disconnected by said element, and means whereby said contacts are connected upon removal of the element to give access to the latch.

21. In a safety lock device, the combination with a member automatically movable into a plurality of advanced positions, a latch automatically movable in one of the advanced positions of the member to retain the member in the advanced position, means for withdrawing the latch to release the member including an element normally preventing access to said latch, a pair of contacts, resilient means tending to connect said contacts and retained in a disconnecting position by the said element when the latter is in the normal position, and means for removing said element to give access to the latch.

22. In a safety lock device, the combination with a member automatically movable into a plurality of advanced positions, manually operable means for withdrawing the said member from the advanced positions, manually releasable means for retaining the member in the said withdrawn position, and means for rendering the withdrawing means inoperable after each withdrawing operation until the said member has again moved into an advanced position.

GEORGE A. SOKOLOVE.